Feb. 15, 1938.                J. M. CAGE                    2,108,259
                         DEHYDRATION SYSTEM
                         Filed April 25, 1930
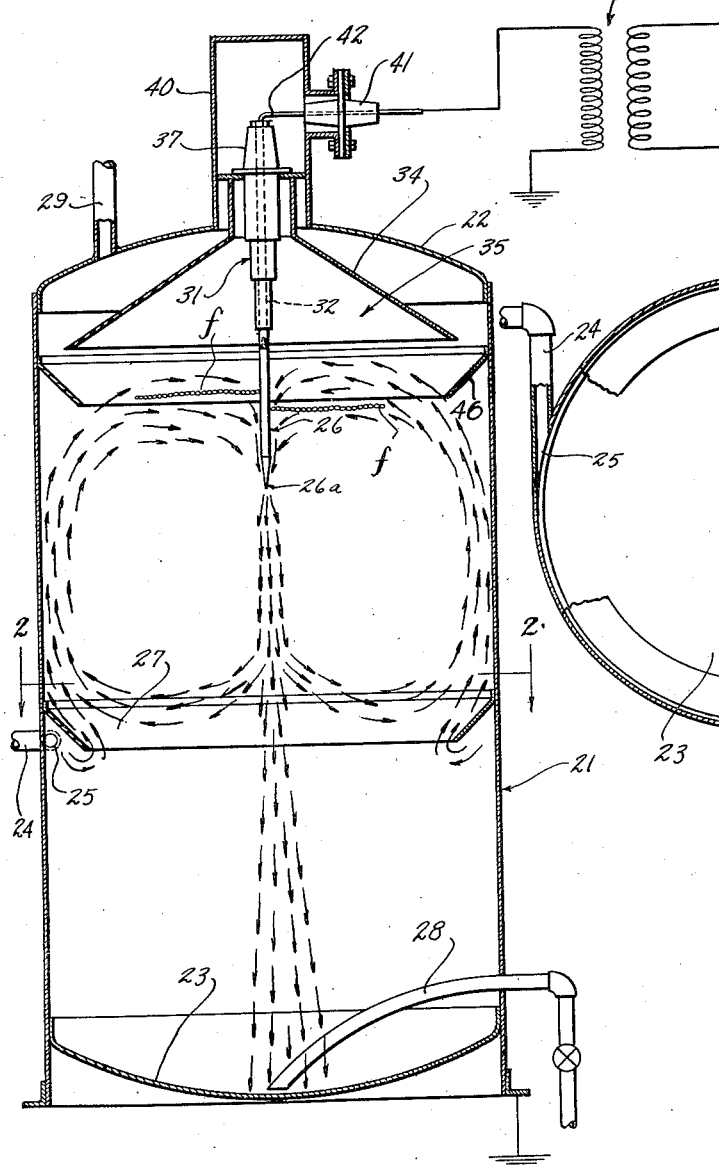
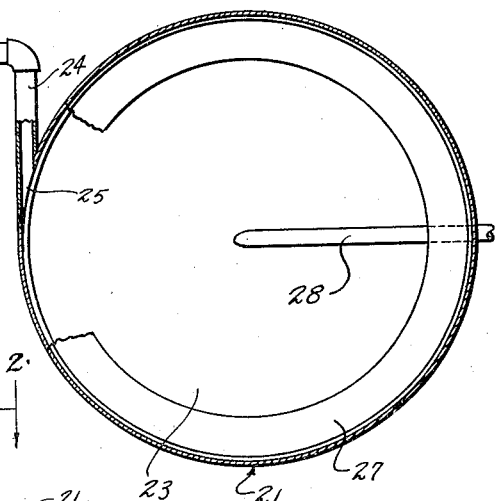
Inventor
John M. Cage
James T Barbeau
Attorney.

Patented Feb. 15, 1938

2,108,259

UNITED STATES PATENT OFFICE 2,108,259

DEHYDRATION SYSTEM

John M. Cage, Los Angeles, Calif., assignor, by mesne assignments, to Petroleum Rectifying Company of California Application April 25, 1930, Serial No. 447,203

4 Claims. (Cl. 204—24)

This invention has general reference to the art of electrically separating substances of differing dielectric values or electrical conductances and specific gravities, such as petroleum emulsions consisting principally of oil surrounding minute particles of water. Such emulsions may also contain, in suspension or solution, solid matter such as rotary mud, sulphur, and various salts in solution.

According to the usual general practice of separating all such foreign substances from oil, the raw emulsion is flowed through a treater tank in which is suspended an electrically charged inner electrode, the treater tank being grounded and constituting the outer electrode. The source of electricity connected across the electrodes is the high potential output of a high tension transformer fed by usual alternating current power mains. The water particles of the emulsion, coming within the influence of the charged electrodes, are caused to gather into larger and larger bodies, which finally become sufficiently large to settle by gravity toward the bottom of the tank, where the water is withdrawn. The cleaned oil rises by virtue of its correspondingly decreased specific gravity, and is withdrawn from the upper end of the tank.

It is the general object of the present invention to provide a method and means whereby the coalescence and settling of the water particles may be greatly promoted, to the ends of reducing the percentage of water left in the treated oil, increasing the rate of treatment, and generally increasing the efficiency of the process.

According to the present invention there is provided a grounded treater tank and an inner live electrode of comparatively small radius of curvature centrally suspended therein, the emulsion being flowed preferably upwardly through the tank for treatment. The electrostatic field between the inner live electrode and the tank is of course at highest gradient near the inner electrode, and grades off in intensity towards the tank wall. The potential applied is of such value that the potential gradient adjacent the inner electrode is sufficiently high to cause active rupture of the oil films surrounding the water particles in that region, while at the same time the gradient at and near the tank wall is below the oil film rupture value. The oil films in the low gradient zone adjacent the tank wall therefore cannot be punctured, and that mass of emulsion accordingly serves as a high impedance to positively block heavy or disruptive current flow. This impedance consists, in effect, of capacitances and resistances in combination, the resistance leakage paths being due to free water content. On the other hand, the relations of the dimensions of the inner electrode, the tank, and the applied potential, are such that a very high potential gradient is obtained adjacent the inner electrode, sufficient to cause very active rupture of the oil films encasing water particles within that region, with consequent coalescence of minute particles to form larger and larger particles.

In the operation of the treater, the coalesced water particles travel, partly by reason of gravity, and partly by other causes which will appear, down the electrode until they reach a downwardly directed point on its lowermost end. The gradient at this point is sufficiently high that the repulsive force between the electrode and the similarly charged water adhering thereto overcomes the surface tension of the water, and as a consequence the water is driven downwardly therefrom with great force. Thus the water is driven in good sized particles downwardly through the oil towards the bottom of the treater, where there is located the water withdrawal pipe. There is thus produced a heavy streaming of water downwardly from the tapered lower end of the electrode, the downwardly pointing electrode acting in the nature of an electric pump, which removes the coalesced water particles from the oil in much less time and with substantially greater completeness than when gravity alone is relied upon. It is to be noted that it is important that the point be directed downwardly rather than laterally, as in certain prior art apparatus, since if the particles were driven off horizontally the cleaning action of the electric water pump would be lost entirely, as the water would in such case have to settle by gravity alone the same as if the discharge point were not used.

The invention will be more fully understood from the following detailed description thereof, reference for this purpose being had to the accompanying drawing, in which:

Fig. 1 is a vertical section of a dehydrator tank incorporating my improvements;

Fig. 1a is an enlarged view of the lower end of an electrode that has been in use in the process; and Fig. 2 is a cross-section taken on line 2—2 of Fig. 1.

Reference is now made to Figs. 1 and 2, in which are illustrated suitable apparatus for carrying out the present process of dehydration. In the form illustrated, the dehydrator embodies a tank 21 closed at the top with a dome 22, and having a bottom 23. The emulsion supply pipe 24 is connected to a tangentially arranged emulsion inlet 25 provided in the side of the tank, the inlet being located preferably somewhat below the lower end of the inner or live electrode 26, hereinafter to be described. The emulsion is discharged from inlet 25 under a conical baffle plate 27 and flows quietly and more or less spirally upwardly from under its lower edge. A pipe 28 withdraws separated water from the lower end of the tank, and another pipe 29 withdraws cleaned oil from the upper end of the tank.

An insulator bushing 31 is mounted in the top of the tank, and passing through bushing 31 is a conductor 32 which connects to the upper end of the inner or live electrode 26, this electrode being supported by and extending downwardly below the lower end of the bushing. The electrode here shown consists of a smooth round steel rod of approximately two and one half inches diameter and, in the present instance, of about three feet in length. The lower end of the electrode is tapered to a point 26a, the tapered point here shown being approximately 10 inches long. The point itself is preferably not sharp, but may be rounded to a curvature of about one half inch, as a perfectly sharp point produces an intense discharge not suited to the physical limitations of the preferred apparatus. With such an electrode, the tank may be in the neighborhood of 10 feet in diameter and 20 feet in height, the electrode being mounted in the relative position illustrated in Fig. 1. These proportions and sizes are, of course, to be taken merely as typical of dimensions which have been found to be effective in practice, and the dimensions given are not to be taken as limitative on the invention.

A conical baffle plate 34 about bushing 31 provides a compartment 35 within which an inert gas may be trapped for protection of the insulator bushing against the oil in the tank.

The upper end of the insulator bushing 37 is preferably encased in an oil filled housing 40, an insulator bushing 41 serving to take a lead 42 from the bushing conductor 32 outside of the housing 40. The lead 42 connects to one side of the high tension winding of a transformer T, the other side of the high tension winding being grounded, as is the dehydrator tank. In a dehydrator of the proportions described, a potential in the neighborhood of 100,000 to 120,000 volts may effectively be applied to the emulsion filled treater.

The treater tank, inner electrode and applied potential being thus relatively proportioned, there is established adjacent the electrode a high potential gradient, sufficient to cause very active attraction between the water particles and rupture of the oil films surrounding the water particles, while at and near the tank wall the gradient is below the oil film rupture value, there being thus an outer zone of emulsion adjacent the tank wall wherein no oil film breakdown occurs, and which serves as a high impedance of combined capacitances and resistances to prevent short circuiting currents between the electrodes.

In the operation of the system, the inflowing emulsion, usually preliminarily heated, rises from inside the edge of baffle 37 up the sides of the tank, and towards the inner electrode. During such travel the oil film encased water particles pass through a field of higher and higher gradient, until at or near the inner electrode the gradient is sufficiently high to cause rupture of the oil films and coalescence of adjacent water particles. Upon reaching the inner electrode, the oil films may be broken, permitting the water to wet the electrode. The water is then of the same charge as the electrode and is in consequence subjected to a repulsive force, but may be prevented from leaving the upper larger diameter portion of the electrode because of surface tension. The water then travels down the electrode rod by gravity, and by other forces which will appear, to the lower tapered end thereof. At the point of the electrode the gradient is sufficient to overcome the adhesion of the water, and the water is driven downwardly therefrom with great force. This downwardly rushing water projected from the point also picks up additional water adjacent the point and carries it downwardly by jet action, as in the familiar steam injector. It will also be seen that this downward projection of water from the point of the electrode aids in dragging the water particles adhering to the upper portion of the electrode down to the point thereof for downward projection.

It is particularly to be noted that the drive of the charged water particles from the electrode is directly downward, and that the effect of the electrode point is thus to act, along with the force of gravity, to force the water particles downwardly through the oil, thereby greatly hastening the collection of the water in the bottom of the treater. This downward propulsion of the water also tends to set up a general closed circulation of the liquids laterally inward toward the electrode, downwardly from its point, and around and back up the treater side walls (see Fig. 1). Of course, this circulation of the liquids is not due to electric action on the water particles alone, but the motion of the water particles through the oil tends by frictional drag to set up a slow ring-circulation of the oil, such as indicated in Fig. 1. The water particles themselves tend to fall or be driven down and out of this ring, while the oil rises in the general circulation adjacent the treater side walls, perhaps still carrying a percentage of water for a second trip laterally to and downwardly from the electrode; but the larger water particles continuously fall out of the circulation at the low point of the circulation ring and rapidly collect in the bottom of the treater for withdrawal.

The cleanest and dryest oil is that which rises in the central portion of the treater about the electrode, and this oil flows out of the treater by way of the path between the outer surface of cone 34 and the inner surface of a baffle plate 46 that inclines downwardly from the inside wall of the tank, as shown, the cleaned oil being finally delivered from the tank by means of pipe 39. The baffle 46 deflects the rising oil and prevents oil closely adjacent the side walls of the treater from rising to the oil outlet, which is desirable since oil rising at the side walls of the treater might not be fully dehydrated due to its distance from the inner electrode.

Fig. 1a shows an electrode which has been in use for a considerable length of time. The upper cylindrical portion of the 2½ inch electrode and the point, down to where the point is about 1½ inches in diameter, are black from the oil. From where the point is 1½ inches in diameter, however, the black grades off until the lower tip of the point is highly polished. This lower polished tip is the portion of the point from which the water particle discharge takes place, and above the polished tip is the portion of the electrode which acts to coalesce water particles but from which there is no such discharge.

And in this connection it is to be pointed out that while the tip on the lower end of the electrode is herein and in the appended claims referred to as a point, that this point may be rounded or have any configuration desired so long as the gradient at the end reaches a sufficiently high value to throw off the water.

It will be recognized that the illustrative system specifically described herein is capable of considerable modification and rearrangement without departing from the spirit and scope of my invention; and it is therefore to be understood that the following claims embrace all such modifications and equivalent arrangements as may fairly be construed to fall within the scope of my invention.

I claim:—

1. In combination in an electric treater for emulsions: a tank providing top and bottom members cooperating in defining a chamber; and means for setting up a ring circulation in said tank which is upward immediately inside said tank and downward in the central portion of said tank, said means including a central live electrode extending downward in said tank and a baffle plate extending inward from said tank below said top member for deflecting inward toward said live central electrode any emulsion rising immediately inside said tank toward said baffle plate.

2. A combination as defined in claim 1 in which said baffle plate is annular and of frustro-conical shape.

3. A combination as defined in claim 1 including an apron extending downward in the upper end of said chamber above said baffle plate to form a compartment and providing an edge disposed vertically above said baffle plate, said edge cooperating with said tank in providing an annular space through which the lighter phase liquid of said emulsion may rise, and including means for withdrawing this lighter phase liquid from said tank at a position above said edge, and including an insulating means supporting said live electrode and disposed in said compartment.

4. In combination in an electric treater for emulsions: a tank; electrode means including a live electrode in said tank for establishing an electric field therein; an apron extending downward in the upper end of said tank and providing a compartment; insulator means in said compartment for insulating said live electrode from said tank; means for withdrawing liquid from the space between said tank and said apron; and deflector means extending inward from said tank at a level below said apron to deflect any stream of rising liquid from flowing directly into the space between said tank and said apron.

JOHN M. CAGE.